United States Patent
Azadeh et al.

(10) Patent No.: US 9,404,431 B2
(45) Date of Patent: Aug. 2, 2016

(54) METHOD AND DEVICE FOR OPERATING AN INTERNAL COMBUSTION ENGINE

(75) Inventors: Reza Azadeh, Regensburg (DE); Gerhard Eser, Hemau (DE); Wolfgang Moser, Regensburg (DE)

(73) Assignee: CONTINENTAL AUTOMOTIVE GMBH, Hannover (DE)

(*) Notice: Subject to any disclaimer, the term of this patent is extended or adjusted under 35 U.S.C. 154(b) by 398 days.

(21) Appl. No.: 13/173,124

(22) Filed: Jun. 30, 2011

(65) Prior Publication Data
US 2012/0004803 A1    Jan. 5, 2012

(30) Foreign Application Priority Data
Jun. 30, 2010  (DE) .......................... 10 2010 025 662

(51) Int. Cl.
*F02D 41/00*  (2006.01)
*F02D 41/14*  (2006.01)
*F02D 41/22*  (2006.01)

(52) U.S. Cl.
CPC ........ *F02D 41/0085* (2013.01); *F02D 41/1498* (2013.01); *F02D 41/22* (2013.01); *F02D 2200/1012* (2013.01); *Y02T 10/40* (2013.01)

(58) Field of Classification Search
CPC .. F02D 41/1498; F02D 41/0085; F02D 41/22
USPC ..................................... 701/29; 123/672, 673
See application file for complete search history.

(56) References Cited

U.S. PATENT DOCUMENTS

| | | | |
|---|---|---|---|
| 2003/0221667 A1* | 12/2003 | Surnilla ........................ | 123/344 |
| 2004/0249553 A1* | 12/2004 | Liskow .......................... | 701/104 |
| 2007/0119436 A1 | 5/2007 | Aliakbarzadeh et al. ..... | 123/674 |
| 2008/0201057 A1 | 8/2008 | Aliakbarzadeh et al. ..... | 701/103 |
| 2009/0078242 A1* | 3/2009 | Aliakarzadeh et al. ....... | 123/673 |
| 2009/0223499 A1* | 9/2009 | Rosel ............................ | 123/672 |
| 2009/0326787 A1 | 12/2009 | Hofmeister et al. .......... | 701/104 |

FOREIGN PATENT DOCUMENTS

| | | | | |
|---|---|---|---|---|
| DE | 102004004291 B3 | 1/2005 | ............. | F02D 41/14 |
| DE | 102005009101 B3 | 3/2006 | ............. | F02D 41/14 |
| DE | 102006012656 A1 | 9/2007 | ............. | F02D 41/00 |
| DE | 102007049615 A1 | 4/2009 | ............. | F02D 41/14 |
| DE | 102008005881 B4 | 2/2010 | ............. | F02D 41/00 |

* cited by examiner

*Primary Examiner* — Fadey Jabr
*Assistant Examiner* — Basil T Jos
(74) *Attorney, Agent, or Firm* — Slayden Grubert Beard PLLC

(57) ABSTRACT

A method and a device operate an internal combustion engine having a plurality of cylinders with which are associated respective injection valves for metering fuel, and having an exhaust gas probe which is arranged in an exhaust gas tract and the measurement signal of which is characteristic of the air/fuel ratio in the respective cylinder, and having a crankshaft angle sensor the measurement signal of which is representative of a crankshaft angle of the crankshaft. Within a predefined operating range of the internal combustion engine, and when at least one predefined condition is fulfilled, a rough-running based cylinder-individual diagnosis (CYBL-HOM) with regard to harmful emissions is carried out before activation of a cylinder-individual lambda control (CILC) is enabled.

18 Claims, 2 Drawing Sheets

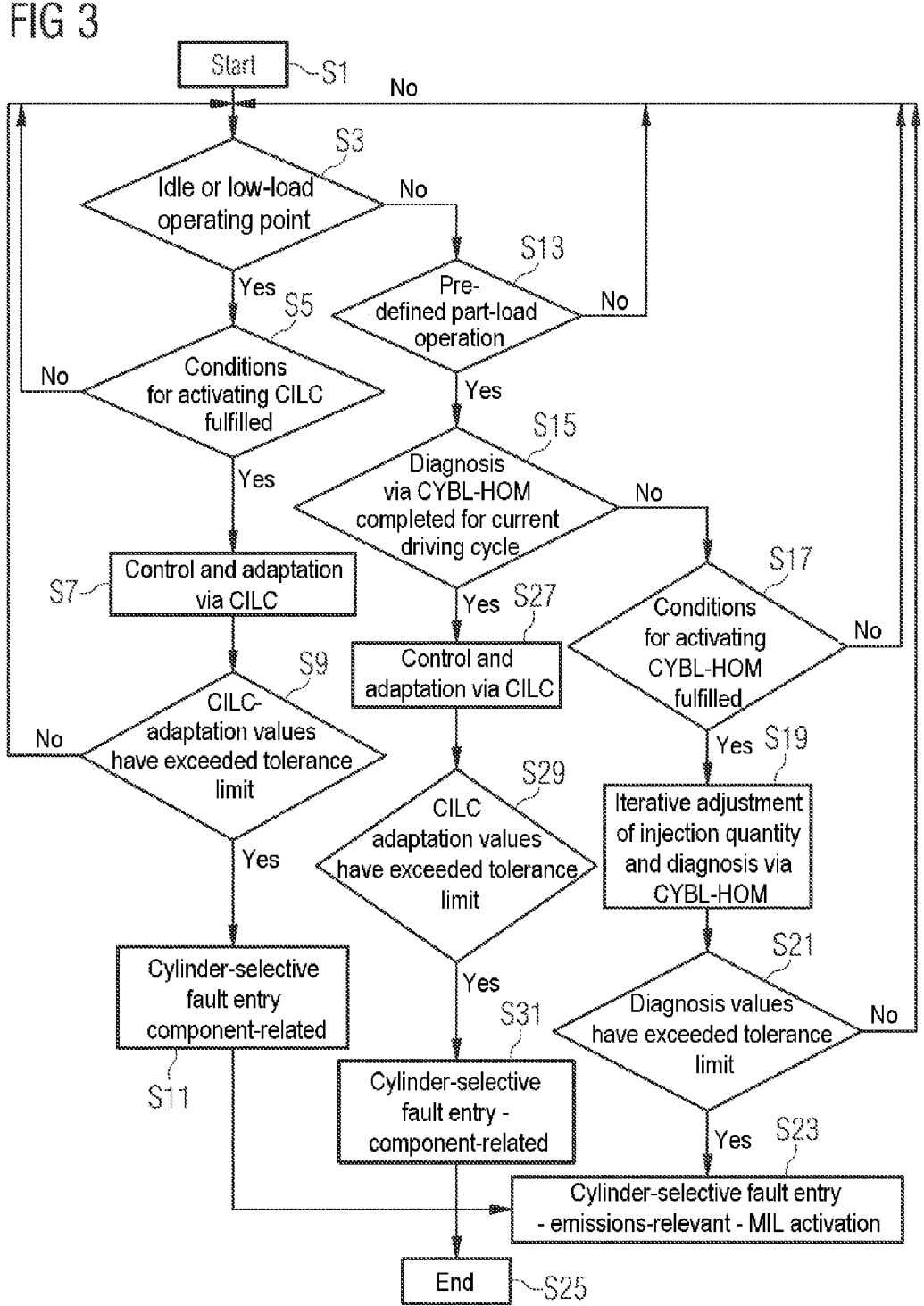

METHOD AND DEVICE FOR OPERATING AN INTERNAL COMBUSTION ENGINE

CROSS-REFERENCE TO RELATED APPLICATIONS

This application claims priority to DE Patent Application No. 10 2010 025 662.5 filed Jun. 30, 2010. The contents of which is incorporated herein by reference in its entirety.

TECHNICAL FIELD

The invention relates to a method and a device for operating an internal combustion engine having a plurality of cylinders with which are associated respective injection valves for metering fuel, and having an exhaust gas probe which is arranged in an exhaust gas tract and the measurement signal of which is characteristic of the air/fuel ratio in the respective cylinder, and having a crankshaft angle sensor the measurement signal of which is representative of a crankshaft angle of a crankshaft.

BACKGROUND

In the context of stringent legal regulations regarding the harmful emissions emitted by motor vehicles, an important measure is to keep to a low level harmful emissions produced in the respective cylinder of the internal combustion engine during combustion of the air/fuel mixture. A further measure is also to use exhaust gas after-treatment systems in internal combustion engines, which systems convert the harmful emissions generated during the combustion process of the air/fuel mixture in the respective cylinders into harmless substances. For this purpose exhaust gas catalytic converters which convert carbon monoxide, hydrocarbon and nitrogen oxides into harmless substances are used.

Both the specified influencing of the production of harmful emissions during combustion, and the conversion of harmful components with high efficiency by means of an exhaust gas catalytic converter, presuppose a very precisely adjusted air/fuel ratio in the respective cylinder.

Especially in conjunction with an arrangement of exhaust gas catalytic converters increasingly close to the engine, and in view of correspondingly specific legal regulations in individual countries, precise cylinder-individual adjustment of the air/fuel ratio is also increasingly important, since the individual exhaust gas packets mix relatively poorly because of the short mixing distance.

Increasingly strict legal regulations regarding the emission of limited pollutants make it necessary to allow small tolerance in the air/fuel ratio between the individual cylinders. Very uneven distribution and an absence of compensation lead to significant deterioration in emissions and even to detectable problems of drivability.

Furthermore, there are legal regulations for detecting cylinder-selective uneven distribution in the air/fuel ratio, which leads to exceeding of the prescribed limit values for emissions, in a progressively increasing proportion of vehicles in relation to the vehicle fleets of the respective producer.

For the purpose of precise cylinder-individual adjustment of the air/fuel ratio in the respective combustion chambers of the respective cylinders, it is known from DE 10 2004 004 291 B3 to utilize cylinder-individual lambda control, by means of which the individual deviations of the respective cylinder-individual air/fuel ratios with respect to a mean air/fuel ratio are to be minimized. A measurement signal of an exhaust gas probe arranged in an exhaust gas tract, which signal is characteristic of the air/fuel ratio in the respective cylinder, is detected at a predefined crankshaft angle in relation to a reference position of the piston of the respective cylinder and is assigned to the respective cylinder. By means of the cylinder-individual lambda controller, there is produced a manipulated variable for influencing the air/fuel ratio in the respective cylinder as a function of the measurement signal generated for the respective cylinder. The predefined crankshaft angle is adapted as a function of an instability criterion of the controller.

A cylinder-individual lambda control, in which a first and a second adaptation value are determined for different temperature ranges as a function of a respective controller value of the cylinder-individual lambda control, is known also from DE 10 2005 009 101 B3.

SUMMARY

According to various embodiments, a method and a device for operating an internal combustion engine can be provided which make possible reliable operation of the internal combustion engine.

According to an embodiment, in a method for operating an internal combustion engine having a plurality of cylinders with which are associated respective injection valves for metering fuel, and having an exhaust gas probe which is arranged in an exhaust gas tract and the measurement signal of which is characteristic of the air/fuel ratio in the respective cylinder, and having a crankshaft angle sensor the measurement signal of which is representative of a crankshaft angle of a crankshaft, within a predefined operating range of the internal combustion engine and when at least one predefined condition is fulfilled, a rough-running based cylinder-individual diagnosis with regard to harmful emissions is carried out before activation of a cylinder-individual lambda control is enabled.

According to a further embodiment, —within a predefined first operating range of the internal combustion engine the cylinder-individual lambda control can be activated without performing the rough-running based diagnosis, —within a predefined second operating range of the internal combustion engine the cylinder-individual lambda control can be enabled for activation without performing the rough-running based diagnosis, —within a predefined second operating range of the internal combustion engine, and when at least one predefined condition is fulfilled, the rough-running based diagnosis with regard to harmful emissions can be carried out before activation of the cylinder-individual lambda control is enabled, a maximum engine speed of the first operating range being lower than a minimum engine speed of the second operating range. According to a further embodiment, the predefined condition can be configured in such a manner that it is fulfilled at least once per driving cycle. According to a further embodiment, in the course of the cylinder-individual lambda control, at least one adaptation value can be adapted, which adaptation value is used in order to adapt the control signal for activating the respective injection valve.

According to a further embodiment, the respective adaptation value can be used during the performing of the rough-running based diagnosis. According to a further embodiment, a component-related diagnosis can be performed in dependence on the at least one adaptation value. According to a further embodiment, a threshold value which is used in the course of the component-related diagnosis can be predefined independently of a threshold value which is used in the course of the rough-running based cylinder-individual diagnosis with regard to harmful emissions. According to a further embodiment, a plausibility check of the at least one adaptation value can be carried out in dependence on the rough-running based diagnosis. According to a further embodiment, a plausibility check of the rough-running based diagnosis can be carried out in dependence on the at least one adaptation value.

According to another embodiment, a device for operating an internal combustion engine having a plurality of cylinders with which are associated respective injection valves for metering fuel, and having an exhaust gas probe which is arranged in an exhaust gas tract and the measurement signal of which is characteristic of the air/fuel ratio in the respective cylinder, and having a crankshaft angle sensor the measurement signal of which is representative of a crankshaft angle of a crankshaft, may be set up in order to perform, within a predefined operating range of the internal combustion engine and when at least one predefined condition is fulfilled, a rough-running based cylinder-individual diagnosis with regard to harmful emissions before activation of a cylinder-individual lambda control is enabled.

BRIEF DESCRIPTION OF THE DRAWINGS

Exemplary embodiments are explained in more detail below with reference to the schematic drawings, in which:

FIG. 3 is a flow diagram of a program for operating the internal combustion engine.

Elements having the same construction and function are designated by the same reference symbols in the different figures.

DETAILED DESCRIPTION

Figure 1:
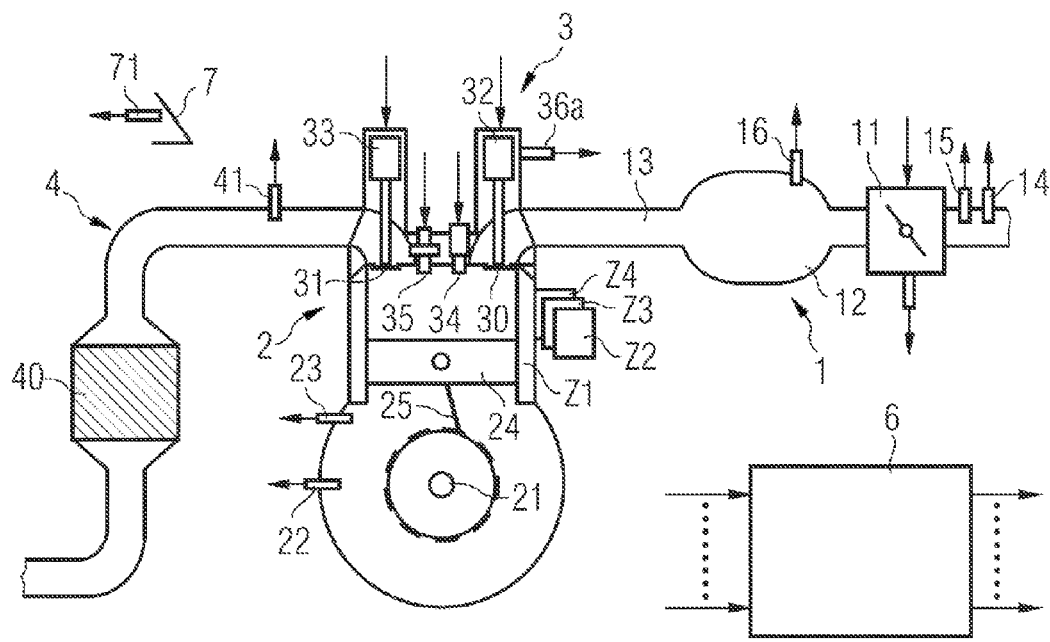
FIG. 1 shows an internal combustion engine with a control device.

According to various embodiments, a method and a corresponding device can be provided for operating an internal combustion engine having a plurality of cylinders with which respective injection valves are associated for metering fuel, and having an exhaust gas probe which is arranged in an exhaust gas tract and the measurement signal of which is characteristic of the air/fuel ratio in the respective cylinder, and having a crankshaft angle sensor the measurement signal of which is representative of a crankshaft angle of the crankshaft. Within a predefined operating range of the internal combustion engine and upon fulfillment of at least one predefined condition, a rough-running based cylinder-individual diagnosis regarding harmful emissions is carried out before activation of a cylinder-individual lambda control is enabled. The predefined operating range of the internal combustion engine may be characterized, inter alia, by a predefined engine speed range, for example.

By performing the rough-running based cylinder-individual diagnosis regarding harmful emissions, exceeding of harmful emissions, especially above a permitted range, can be detected at an early stage. In this way, after a positive diagnosis, based on rough running, regarding observance of the permitted harmful emissions, reliable operation by means of the lambda control then optionally activated can take place within the predefined operating range.

In this context it is also possible that a diagnosis, in particular a component-based diagnosis, is carried out within the framework of the cylinder-individual lambda control, so that, for example, a faulty injection valve can be detected, which fault may be caused, for example, by a coked nozzle needle or by deposits on the injection valve, leading to deterioration of the injection.

However, such faults do not necessarily have an influence on emissions which is relevant to predefined limit values, since these can also be compensated, for example, by a suitable exhaust system with appropriate processing of pollutants.

In this context it has been found that, at least within a predefined operating range of the internal combustion engine, the rough-running based cylinder-individual diagnosis operates very precisely with regard to the detection of pollutant-relevant emissions.

In addition, it is also possible, in the context of a component diagnosis which is optionally also carried out in the course of the cylinder-individual lambda control, to set the limit values more narrowly than would be required when using such a diagnosis for an emission of harmful substances. Thus, a fault in the respective component, for example the injection valve, can be detected earlier and more reliably in this way. Moreover, it is also possible in this way to carry out the rough-running based cylinder-individual diagnosis only with regard to harmful emissions, and therefore, with suitable parameterization, in particular of predefined threshold values, to be required to take account in the diagnosis only of the emissions-relevant marginal conditions, but not of marginal conditions relating to components.

In the course of the rough-running based cylinder-individual diagnosis, an active adjustment, for example, of the air/fuel ratio in the respective cylinders is carried out. For example, the cylinder currently to be analyzed is progressively adjusted more and more in the direction of "lean", a corresponding compensation taking place in the respective other cylinders by correspondingly opposite adjustment of the air/fuel ratio. Such varying of the respective air/fuel ratio is preferably carried out until a rough-running value has reached or exceeded a predefined threshold value.

The diagnosis may then be performed, for example, by means of the control signal for the respective cylinder, which control signal has been adjusted at this time and may also be represented, for example, by means of an adjusted injection quantity, and by a comparison of the control signal/injection quantity with a reference value corresponding, for example, to the mean value of the respective cylinders when performing the diagnosis for the individual cylinders. In the case of a correspondingly high deviation, for example above 25%, an emissions-relevant fault can then be inferred and suitable measures initiated.

Cylinder-individual lambda control is known, for example, from DE 10 2004 004 291 B3, the content of which in this regard is incorporated herewith. Furthermore, cylinder-individual lambda control is also known from DE 10 2005 009 101 B3, the content of which in this regard is also incorporated herewith.

Thus, in the context of the cylinder-individual lambda control, the respective cylinder-individual lambda values are, for example, determined and control signals for the respective injection valves are correspondingly adapted for the purpose of equalizing the actual air/fuel ratios in the respective cylinders.

In addition, activation of the cylinder-individual lambda control may additionally be enabled in dependence on the quality of the diagnosis, in terms of the result of the rough-running based diagnosis regarding harmful emissions, or in dependence on a number of interruptions during the performing of the rough-running based diagnosis, and on the result of the rough-running based diagnosis regarding harmful emissions.

According to an embodiment, activation of the cylinder-individual lambda control is enabled within a predefined first operating range of the internal combustion engine without carrying out the rough-running based diagnosis. Within a predefined second operating range of the internal combustion engine the rough-running based diagnosis regarding harmful emissions is carried out upon fulfillment of at least one predefined condition, before activation of the cylinder-individual lambda control is enabled.

In this context a maximum engine speed of the first operating range is lower than a minimum engine speed of the second operating range. Use is thereby made of the consideration that the rough-running based diagnosis can be performed especially reliably in the second operating range. In this way use is therefore made of the consideration that, depending on the quality of the measurement signal used in the rough-running based diagnosis, especially within a somewhat higher engine-speed range, that is, especially in part-load operation, the quality is sufficiently high to deliver reliable diagnosis results. In some cases this is not fulfilled at very low engine speeds, for example at idle or in a speed range close to idle, so that it seems expedient to dispense with the rough-running based diagnosis in this operating range.

It has been found that cylinder-individual lambda control can also, and especially, be performed very precisely in the first operating range, which may also include very low engine speeds, and in particular that the diagnosis optionally carried out within this lambda control can also be very precise.

According to an embodiment, the predefined condition is configured in such a manner that it is fulfilled at least once per driving cycle. In particular, this should be seen in relation to the respective operating range.

In this way the performing of the rough-running based cylinder-individual diagnosis can be effectively reduced to only the amount required.

According to an embodiment, at least one adaptation value, which is used to adapt a control signal for activating the respective injection valve, is adapted during the cylinder-individual lambda control. In this way, the at least one adaptation value can then also be used under operating conditions in which the cylinder-individual lambda control is not active in order to adapt the control signal for activating the respective injector valve. This ensures reduced emission of harmful substances over all the operating states of the internal combustion engine. For example, at least one different adaptation value can thus be provided in each case for different operating ranges, and/or different adaptation values can also be provided, for example, for different temperature ranges.

In this connection it is advantageous if the respective adaptation value is optionally also used during the performing of the rough-running based diagnosis, in order to adapt the control signal of the respective injection valve. In this context, however, it is advantageous in some cases to take suitable account of the respective adaptation value also within the rough-running based diagnosis.

According to a further embodiment, the component-related diagnosis is carried out in dependence on the at least one adaptation value.

According to a further embodiment, a threshold value which is used in the component-related diagnosis is specified independently of a threshold value which is used in the rough-running based cylinder-individual diagnosis regarding harmful emissions.

According to a further embodiment, a plausibility check of the at least one adaptation value is carried out in dependence on the rough-running based diagnosis. In this way monitoring of the functionality of the cylinder-individual lambda control, and of the determination and adaptation of the adaptation value which accompanies it, can be simply performed, and greater protection against faults can therefore be ensured.

According to a further embodiment, a plausibility check of the rough-running based diagnosis is carried out in dependence on the at least one adaptation value. By this inverse route an error in the rough-running based diagnosis can in some cases be detected and the overall reliability of the diagnosis improved.

An internal combustion engine (FIG. 1) comprises an induction tract 1, an engine block 2, a cylinder head 3 and an exhaust gas tract 4. The induction tract 1 preferably includes a throttle flap 11 together with a collector 12 and an intake pipe 13, which leads into the engine block 2 via an inlet duct to a cylinder Z1. The engine block 2 further includes a crankshaft 21 which is coupled to the piston 24 of the cylinder Z1 via a connecting rod 25.

The cylinder head 3 includes a valve mechanism with a gas inlet valve 30, a gas outlet valve 31 and valve drives 32, 33. The cylinder head 3 further includes an injection valve 34 and a spark plug 35. Alternatively, the injection valve 34 may be arranged in the intake tract 1.

The exhaust gas tract 4 includes an exhaust gas catalytic converter 40 which is preferably in the form of a three-way catalytic converter.

A control device 6, with which are associated sensors which acquire various measured variables and determine the measurement values of the measured variables, is provided. Apart from the measured variables, operating variables also include variables derived therefrom. As a function of at least one of the operating variables, the control device 6 controls the actuators which are associated with the internal combustion engine, and which each have corresponding actuating drives, by generating control signals for the actuating drives.

The control device 6 may also be referred to as a device for operating the internal combustion engine.

The sensors are a pedal position detector 71 which detects the position of the accelerator pedal 7, a mass air flow sensor 14 which detects a mass air flow upstream of the throttle flap 11, a temperature sensor 15 which detects an intake air temperature, a pressure sensor 16 which detects the intake pipe pressure, a crankshaft angle sensor 22 which detects a crankshaft angle, with which a rotational speed N is then associated, a torque sensor 23 which detects a torque of the crankshaft 21, a camshaft angle sensor 36a which detects a camshaft angle, and an exhaust gas probe 41, which detects a residual oxygen content of the exhaust gas and the measurement signal of which is characteristic of the air/fuel ratio in the cylinder Z1 during combustion of the air/fuel mixture. The exhaust gas probe 41 is preferably in the form of a linear lambda probe and thus generates a measurement signal proportional to the air/fuel ratio over a wide relevant range of the air/fuel ratio.

Depending on the configuration, any desired subset of the sensors mentioned may be present, or additional sensors may also be present.

The actuators are, for example, the throttle flap 11, the gas inlet and gas outlet valves 30, 31, the injection valve 34 or the spark plug 35.

In addition to the cylinder Z1, further cylinders Z2 to Z4 with which corresponding actuators are also associated, are provided. A respective exhaust gas train of the exhaust gas tract 4 is preferably associated with each exhaust bank of cylinders, which may also be referred to as a cylinder bank, and a respective exhaust gas probe 41 is correspondingly associated in each case with the respective exhaust gas train.

The control device 6 preferably includes an arithmetic unit and a memory for storing data and programs. In order to operate the internal combustion engine, a program for operating the internal combustion engine which can be run in the arithmetic unit during operation is stored in the control device 6, which program is designed to execute a rough-running based cylinder-individual diagnosis CYBL-HOM with regard to harmful emissions within a predefined operating range of the internal combustion engine when at least one predefined condition is met, before activation of a cylinder-individual lambda control CILC is enabled.

Figure 2:
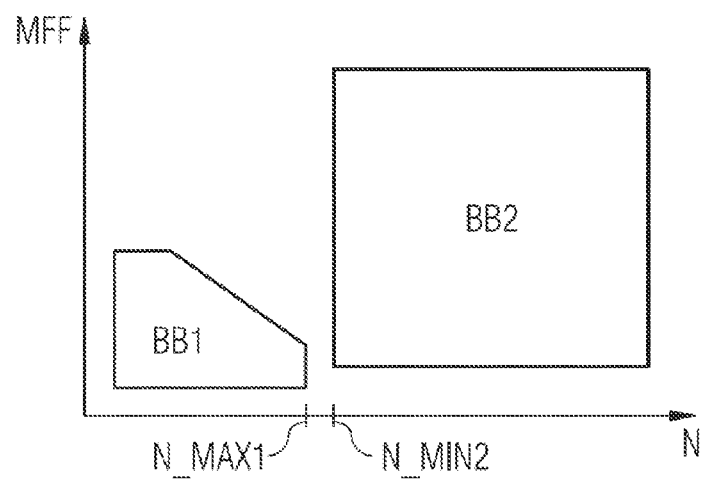
FIG. 2 is a diagram in which operating ranges of the internal combustion engine are plotted.

For example, a first operating range BB1 (FIG. 2) and a second operating range BB2 are provided in this context. The operating ranges are characterized, in particular, in that they are configured to be without overlap with respect to the engine speed N. Thus the first operating range BB1 extends, for example, up to a maximum engine speed N_MAX1 of the first operating range, and the second operating range BB2 begins in terms of engine speed from a minimum engine speed N_MIN2 of the second operating range BB2. The maximum engine speed N_MAX1 of the first operating range BB1 is lower than the minimum engine speed N_MIN2 of the second operating range BB2. Depending on the internal combustion engine, they may have different values in each case. For example, the maximum engine speed N_MAX1 of the first operating range is approximately 1000 RPM. The minimum engine speed N_MIN2 of the second operating range BB2 is, for example, approximately 1200 RPM.

The second operating range extends substantially within a so-called part-load range and, depending on the internal combustion engine, may extend, for example, to approximately 3000 RPM, although in principle it may extend higher. The first operating range extends, with respect to the fuel quantity MFF to be metered, for example up to approximately 12 mg/stroke, which, however, may vary in principle from one internal combustion engine to another. The second operating range BB2 extends, for example, from approximately 10 mg/stroke to approximately 20 mg/stroke, which, however, may also vary depending on the internal combustion engine.

In addition, the respective operating range may also be demarcated from respective other operating ranges, depending on further operating variables of the internal combustion engine, such as a geodetic height, or the presence of a stationary operating state or the current non-presence of a cylinder switch-off mode.

In an embodiment, the program for operating the internal combustion engine is started in a step S1 (FIG. 3) in which variables can optionally be initialized. The start preferably takes place in time-proximity to an engine start. It is then checked in a step S3 whether, for example, the first operating range BB1 is present. This range may include, for example, an idle or low-load operating point. It is checked with reference to the current engine speed and/or fuel quantity MFF to be injected, and optionally to other operating variables, whether this is the case.

If the condition of step S3 is fulfilled, it is checked in a step S5 whether activation of the cylinder-individual lambda control CILC is possible. Thus, the cylinder-individual lambda control is preferably activated, for example, only in an at least almost stationary or stationary operating state. If the condition of step S5 is not fulfilled, the processing is again continued in step S3, optionally after a predefinable wait time.

Conversely, if the condition of step S5 is fulfilled, the cylinder-individual lambda control CILC is activated and, for example, corresponding control values for adapting the respective control signal to activate the respective injection valve 34 are determined and are also adapted to one or more adaptation values, this being executed preferably in such a way that, upon adaptation of the respective adaptation value, a control value valid at that time is adapted correspondingly in the opposite direction, in order to achieve a constant overall effect.

In a step S9 it is checked whether one or more adaptation values which were determined in the context of the cylinder-individual lambda control CILC have exceeded a tolerance limit, that is, have exceeded a predefined threshold value, for example. This predefined threshold value may be selected, for example, such that it corresponds to approximately 10% of the quantity of fuel to be metered thereby conditioned, in comparison to the mean adaptation performed for other injection valves.

If the condition of step S9 is fulfilled, in a step S11 a cylinder-selective fault entry, for example, is made, specifically in relation to a component, that is, with regard to a fault in the respective injection valve, for example.

This fault entry is preferably made in a fault memory the content of which, depending on the configuration, is then signaled, for example, via an output device of a vehicle, or is made available for read-out via a corresponding diagnosis interface while the vehicle is at a workshop.

If the condition of step S9 is not fulfilled, the processing is preferably continued in step S3, optionally after a specified wait time.

In principle, step S9 or S11 may also be carried out practically in parallel to the other steps of the program, as shown in FIG. 3.

If the condition of step S3 is not fulfilled, it is checked in a step S13 whether, in particular, the second operating range BB2 of the internal combustion engine is adopted. As in step S3, this is done in dependence on corresponding current operating variables of the internal combustion engine. The second operating range BB2 includes, in particular, a predefined part-load operation.

If the condition of step S13 is not fulfilled, the processing is again continued at step S3, optionally after the predefinable wait time.

However, if the condition of step S13 is fulfilled, it is checked in a step S15 whether at least one predefined condition for performing a rough-running based cylinder-individual diagnosis CYBL-HOM is fulfilled. The predefined condition is configured, for example, in such a manner that it is fulfilled at least once per driving cycle, in particular in relation to the second operating range BB2. It is therefore checked in step S15 whether the rough-running based diagnosis CYBL-HOM has already been performed in the current driving cycle. If this is not the case it is checked in a step S17 whether at least one precondition for activating the rough-running based diagnosis regarding harmful emissions is fulfilled. This precondition may depend, in particular, on at least one operating variable of the internal combustion engine and also, for example, on whether a predefined stationary operating state is present. If the condition of step S17 is not fulfilled, the processing is again continued at step S3, optionally after the predefined wait time.

If the condition of step S17 is fulfilled, the processing is continued at a step S19. In step S19 the rough-running based diagnosis CYBL-HOM is performed, at least partially. Within the diagnosis an iterative adjustment of the injection quantity is carried out on the respective injection valves 34, specifically in that the injection quantity of one cylinder is varied in the opposite direction to that of all other cylinders.

For example, an increasingly lean adjustment, and therefore a reduction in the injection quantity to be metered, is carried out iteratively for the one cylinder. In parallel, it is detected how this affects a rough-running parameter in relation to the respective cylinder. This may be effected, for example, by evaluating the measurement signal of the torque sensor 23 and/or in dependence on the measurement signal of the crankshaft angle sensor. In this case, especially as a function of the measurement signal of the crankshaft angle sensor, an acceleration signal may be determined which represents the contribution made by the combustion of the air/fuel mixture taking place in the respective cylinder to the respective acceleration of the crankshaft.

This is performed progressively until a predefined threshold value for a predefined running roughness is exceeded. Once this is the case, a parameter is preferably determined which is representative of the degree of variation of the injection quantity in relation to the respective cylinder. This procedure is preferably then carried out correspondingly for each of the cylinders of the internal combustion engine and then, depending on the parameters thus determined, a relative deviation between the cylinders is, in particular, determined. This relative deviation is then again compared to a predefined diagnosis threshold value in relation to the respective cylinder, which preferably is done in a step S21.

The diagnosis threshold value may be, for example, in the region of 25%. If the condition in step S21 is then not fulfilled, a flag, for example, for the successful performance of the rough-running based diagnosis with regard to harmful emissions in a current driving cycle is set to "true", and the processing is then continued in step S3.

Conversely, if the condition of step S21 is fulfilled, a cylinder-selective fault entry, for example, is made in the fault memory, which entry is then to be classified as emissions-relevant, leading to activation of the fault display, also referred to as the malfunction indicator lamp (MIL) (step S23). The processing is then ended in a step S25.

If the condition of step S15 is fulfilled, the cylinder-individual lambda control CILC is therefore enabled for activation. In step S27 the cylinder-individual lambda control is activated and by means of this a control operation is then performed, and preferably also the adaptation of at least one adaptation value. In a step S29 it is checked whether the adaptation value or values which were determined and adapted in the cylinder-individual lambda control CILC have exceeded a predefined tolerance limit, that is, in particular, a predefined diagnosis threshold.

This threshold may be, for example, in the region of 10%, this being related, in particular, to the influence which the respective adaptation value has on the metering of fuel mass through the respective cylinder and on the adaptation of the control signal for metering the respective fuel by means of the respective injection valve 34.

If the condition of step S29 is fulfilled, a respective cylinder-selective fault entry is made, in particular a component-related entry, in a step S31. If the condition of step 29 is not fulfilled, the cylinder-individual lambda control is, for example, continued further, or a renewed jump to step S3 may, for example, be made. Steps S29 and S13 may be run practically in parallel to the other steps of the program, as shown in FIG. 3.

In principle, it is possible that the fault entries described in relation to steps S11 to S31 and S23 lead to corresponding reactions, that is, are classified as actual faults, only if they have been detected multiple times in a predefined manner, which may be representative, for example, of a permanent fault.

The procedure advantageously utilizes the consideration that emissions-relevant effects frequently emerge only in the case of larger deviations of the injection parameters with respect to the respective injection valves than are to be defined for a component-related fault observation. Thus they frequently emerge, for example, as a deviation beyond 15% in relation to control signals influencing the supposed injection quantity. It can therefore be avoided by means of the procedure that a component-based diagnosis would in some cases no longer be possible with sufficient accuracy in the case of substantially higher threshold values in the cylinder-individual lambda control with respect to a diagnosis based thereon, which diagnosis would be emissions-based.

The components may also include, for example, external EGR lines and their deposits.

It is preferably ensured by the procedure that, for example, the rough-running based diagnosis with regard to harmful emissions CYCL-HOM is carried out at least once per driving cycle. In principle, an operation alternating with the cylinder-individual lambda control CILC is also possible. It is also possible in principle that a plausibility check of the rough-running based diagnosis CYBL-HOM is carried out by means of the at least one adaptation value, and optionally inversely. Such plausibility monitoring can provide additional certainty, which can be of major importance for a fault entry. In this way increased operating security can also be achieved in the event of faults in the signal line of the rough-running based diagnosis CYBL-HOM or of the cylinder-individual lambda control CILC.

What is claimed is:

1. A method for operating an internal combustion engine having a plurality of cylinders and associated respective injection valves for metering fuel, and having an exhaust gas probe and a crankshaft angle sensor, the method comprising:
within a predefined operating range of the internal combustion engine and when at least one predefined condition is fulfilled:
executing, by a processor, a program stored in non-transitory computer-readable media to perform a cylinder-specific rough-running based diagnosis with regard to harmful emissions, the cylinder-specific rough-running based diagnosis comprising, for each respective cylinder of the plurality of cylinders, an iterative process including:
adjusting an air/fuel ratio for that respective cylinder in a lean direction while increasing the air/fuel ratio for the other cylinders;
detecting an operational value of the internal combustion engine resulting from the air/fuel ratio adjustment;
comparing the detected operational value of the internal combustion engine to a predefined threshold value corresponding to a predefined running roughness; and
iteratively repeating the adjusting, measuring, and comparing steps until the detected operational value reaches or exceeds the predefined threshold value corresponding to the predefined running roughness,
determining, by the processor, the presence of a cylinder-specific fault based on a comparison of the results of the cylinder-specific rough-running based diagnosis for each of the plurality of cylinders, and
determining, by the processor, whether to enable activation of a cylinder-individual lambda control based on the results of the cylinder-specific rough-running based diagnosis.

2. The method according to claim 1, wherein
within a predefined first operating range of the internal combustion engine the cylinder-individual lambda control is activated without performing the rough-running based diagnosis,
within a predefined second operating range of the internal combustion engine the cylinder-individual lambda control is enabled for activation without performing the rough-running based diagnosis,
within a predefined second operating range of the internal combustion engine, and when at least one predefined condition is fulfilled, the rough-running based diagnosis with regard to harmful emissions is carried out before activation of the cylinder-individual lambda control is enabled, a maximum engine speed of the first operating range being lower than a minimum engine speed of the second operating range.

3. The method according to claim 1, wherein the predefined condition is configured in such a manner that it is fulfilled at least once per driving cycle.

4. The method according to claim 1, wherein in the course of the cylinder-individual lambda control, at least one adaptation value is adapted, which adaptation value is used in order to adapt the control signal for activating the respective injection valve.

5. The method according to claim 4, wherein the respective adaptation value is used during the performing of the rough-running based diagnosis.

6. The method according to claim 1, wherein a component-related diagnosis is performed in dependence on the at least one adaptation value.

7. The method according to claim 6, wherein a threshold value which is used in the course of the component-related diagnosis is predefined independently of a threshold value which is used in the course of the rough-running based cylinder-individual diagnosis with regard to harmful emissions.

8. The method according to claim 1, wherein a plausibility check of the at least one adaptation value is carried out in dependence on the rough-running based diagnosis.

9. The method according to claim 1, wherein a plausibility check of the rough-running based diagnosis is carried out in dependence on the at least one adaptation value.

10. A control device for operating an internal combustion engine having a plurality of cylinders and associated respective injection valves for metering fuel, and having an exhaust gas probe and a crankshaft angle sensor, the control device comprising:
a processor; and
a program stored in a non-transitory computer-readable memory device and executable by the processor to:
within a predefined operating range of the internal combustion engine and when at least one predefined condition is fulfilled:
perform a cylinder-specific rough-running based diagnosis with regard to harmful emissions, the cylinder-specific rough-running based diagnosis comprising, for each respective cylinder of the plurality of cylinders, an iterative process including:
adjusting an air/fuel ratio for that respective cylinder in a lean direction while not similarly adjusting the air/fuel ratio for the other cylinders;
detecting an operational value of the internal combustion engine resulting from the air/fuel ratio adjustment;
comparing the detected operational value of the internal combustion engine to a predefined threshold value corresponding to a predefined running roughness; and
iteratively repeating the adjusting, measuring, and comparing steps until the detected operational value reaches or exceeds the predefined threshold value corresponding to the predefined running roughness,
determine the presence of a cylinder-specific fault based on a comparison of the results of the cylinder-specific rough-running based diagnosis for each of the plurality of cylinders, and
determine whether to enable activation of a cylinder-individual lambda control based on the results of the cylinder-specific rough-running based diagnosis.

11. The control device according to claim 10, wherein the control device is further operable
within a predefined first operating range of the internal combustion engine, to activate the cylinder-individual lambda control without performing the rough-running based diagnosis,
within a predefined second operating range of the internal combustion engine, to enable the cylinder-individual lambda control for activation without performing the rough-running based diagnosis,
within a predefined second operating range of the internal combustion engine, and when at least one predefined condition is fulfilled, to carry out the rough-running based diagnosis with regard to harmful emissions before activation of the cylinder-individual lambda control is enabled, a maximum engine speed of the first operating range being lower than a minimum engine speed of the second operating range.

12. The control device according to claim 10, wherein the predefined condition is configured in such a manner that it is fulfilled at least once per driving cycle.

13. The control device according to claim 10, wherein the control device is configured to adapt, in the course of the cylinder-individual lambda control, at least one adaptation value, which adaptation value is used in order to adapt the control signal for activating the respective injection valve.

14. The control device according to claim 13, wherein the control device is configured to use the respective adaptation value during the performing of the rough-running based diagnosis.

15. The control device according to claim 10, wherein the control device is configured to perform a component-related diagnosis in dependence on the at least one adaptation value.

16. The control device according to claim 15, wherein the control device is configured to predefine a threshold value, which is used in the course of the component-related diagnosis, independently of a threshold value which is used in the course of the rough-running based cylinder-individual diagnosis with regard to harmful emissions.

17. The control device according to claim 10, wherein the control device is configured to carry out a plausibility check of the at least one adaptation value in dependence on the rough-running based diagnosis.

18. The control device according to claim 10, wherein the control device is configured to carry out a plausibility check of the rough-running based diagnosis in dependence on the at least one adaptation value.

* * * * *